(12) United States Patent
Ooba

(10) Patent No.: US 7,511,751 B2
(45) Date of Patent: Mar. 31, 2009

(54) CCD LINEAR SENSOR

(75) Inventor: Megumi Ooba, Fukuoka (JP)

(73) Assignee: Sony Corporation, Tokyo (JP)

( * ) Notice: Subject to any disclaimer, the term of this patent is extended or adjusted under 35 U.S.C. 154(b) by 536 days.

(21) Appl. No.: 11/065,672

(22) Filed: Feb. 24, 2005

(65) Prior Publication Data

US 2005/0212938 A1 Sep. 29, 2005

(30) Foreign Application Priority Data

Feb. 25, 2004 (JP) ............... P2004-050140
Feb. 22, 2005 (JP) ............... P2005-045710

(51) Int. Cl.
  *H04N 5/335* (2006.01)
  *H04N 5/235* (2006.01)
(52) U.S. Cl. .................. 348/294; 348/362
(58) Field of Classification Search ......... 257/290;
  348/311, 299, 296, 297, 324, 362, 273, 274,
  348/518; 365/185.27; 358/482, 483, 514;
  250/208.1
See application file for complete search history.

(56) References Cited

U.S. PATENT DOCUMENTS

| | | | |
|---|---|---|---|
| 5,528,291 A * | 6/1996 | Oda | 348/220.1 |
| 6,084,273 A * | 7/2000 | Hirota | 257/368 |
| 6,351,001 B1 * | 2/2002 | Stevens et al. | 257/223 |
| 6,426,776 B1 * | 7/2002 | Ochi | 348/370 |
| 6,436,729 B1 * | 8/2002 | Abe | 438/60 |
| 7,119,350 B2 * | 10/2006 | Hashimoto et al. | 250/559.38 |
| 7,129,979 B1 * | 10/2006 | Lee | 348/308 |
| 2005/0212938 A1 * | 9/2005 | Ooba | 348/311 |

* cited by examiner

*Primary Examiner*—Tuan V Ho
*Assistant Examiner*—Tuan H Le
(74) *Attorney, Agent, or Firm*—Sonnenschein Nath & Rosenthal LLP

(57) ABSTRACT

A CCD linear sensor includes a substrate, sensing elements in a row on the substrate, electronic shutter gates at sides of the respective sensing elements, and an overflow barrier below the sensing elements. The potential at the overflow barrier is higher than the potential at the electronic shutter gates and varies with a voltage applied to the substrate.

3 Claims, 7 Drawing Sheets

SATURATED CHARGE STORAGE
CAPACITY OF SENSING ELEMENTS (mV)

FIG. 6 – PRIOR ART

CCD LINEAR SENSOR

RELATED APPLICATION DATA

The present application claims priority to Japanese Application(s) No(s). P2004-050140 filed Feb. 25, 2004, and P2005-045710 filed Feb. 22, 2005, which application(s) is/are incorporated herein by reference to the extent permitted by law.

BACKGROUND OF THE INVENTION

1. Field of the Invention

The present invention relates to charge-coupled device (CCD) linear sensors.

2. Description of the Related Art

Image-reading units including CCD linear sensors are included in a variety of known electronic apparatuses, for example, image scanners, copying machines, and facsimile machines.

A CCD linear sensor includes a horizontal electronic shutter mechanism. For example, as disclosed in Japanese Unexamined Patent Application Publication No. 11-135766, a CCD linear sensor includes a sensor array including a row of sensing elements on a substrate, a horizontal transfer register parallel to the sensor array at a first side of the sensor array, read gates between the sensing elements and the horizontal transfer register, an electronic shutter drain parallel to the sensor array at a second side of the sensor array, and electronic shutter gates parallel to the sensor array between the sensor array and the electronic shutter drain.

In normal operation, electric charge built up in the sensing elements is transferred to an image-processing circuit through the read gates and the horizontal transfer register. In operation of electronic shutters, electric charge built up in the corresponding sensing element is discharged to the electronic shutter drain through the electronic shutter gates.

In this CCD linear sensor, the potential at the electronic shutter gates is kept higher than that at the read gates so that saturated charge storage capacity in each sensing element is determined by the potential at the electronic shutter gates. In this arrangement, when electric charge to be stored in each sensing element exceeds the saturated charge storage capacity, excess electric charge overflows into the electronic shutter drain through the electronic shutter gates.

That is, in the known CCD linear sensor including the horizontal electronic shutter mechanism, the electronic shutter gates also serve as overflow barriers that determine the saturated charge storage capacity in each sensing element.

However, this arrangement is likely to cause variance in output signals from the sensor array.

That is, in the known CCD linear sensor, since the electronic shutter gates extend in the shape of a narrow strip, it is likely that the electronic shutter gates are not accurately formed on a wafer by a semiconductor manufacturing process, for example, a lithographic step and an etching step. That is, the manufacturing error of the electronic shutter gates will probably occur. For example, the length of the electronic shutter gates and the impurity profile in the electronic shutter gates will vary. Thus, potentials of the electronic shutter gates are likely to vary for the individual sensing elements, and the saturated charge storage capacity varies from sensing element to sensing element, as schematically shown in FIG. 6. Consequently, variance occurs in output signals from the sensor array.

SUMMARY OF THE INVENTION

Accordingly, a CCD linear sensor according to an embodiment of the present invention includes a substrate; sensing elements in a row on the substrate; electronic shutter gates at sides of the respective sensing elements; and an overflow barrier below the sensing elements, the potential at the overflow barrier being higher than the potential at the electronic shutter gates.

In this arrangement, saturated charge storage capacity in each sensing element can be determined by the potential at the overflow barrier. Thus, even when variance occurs in manufacturing the electronic shutter gates, the saturated charge storage capacity in each sensing element can be kept constant, and variance in output signals from the CCD linear sensor can be suppressed.

Preferably, the potential at the overflow barrier varies with a voltage applied to the substrate.

In this arrangement, the saturated charge storage capacity in each sensing element can be changed merely by the voltage applied to the substrate. This improves the usability of the CCD linear sensor.

DESCRIPTION OF THE PREFERRED EMBODIMENTS

A CCD linear sensor according to the present invention is included in an image-reading unit in a variety of electronic apparatuses and converts read-out images to electrical signals.

This CCD linear sensor includes a row of sensing elements on a substrate and a horizontal electronic shutter mechanism including electronic shutter gates at the side of the row of sensing elements and parallel to the row of sensing elements.

An overflow barrier is provided in the substrate at least below the sensing elements. The potential at the overflow barrier is higher than that at the electronic shutter gates.

Thus, in this CCD linear sensor, the saturated charge storage capacity in each sensing element can be determined by the potential at the overflow barrier.

Accordingly, even when variance occurs in manufacturing the electronic shutter gates, the saturated charge storage capacity in each sensing element can be kept constant, and variance in output signals from the CCD linear sensor can be suppressed.

Moreover, when the potential at the overflow barrier can be changed by a voltage applied to the substrate, the saturated charge storage capacity in each sensing element can be changed merely by a voltage applied to the substrate. This improves the usability of the CCD linear sensor.

Moreover, since the saturated charge storage capacity is determined by the potential at the overflow barrier, the potential at the electronic shutter gates need not be used for controlling the saturated charge storage capacity. Thus, the potential at the electronic shutter gates can be pinned to a certain low level. This will increase the electric potential gradient from the sensing elements to the horizontal transfer register, so that electric charge can be readily transferred from the sensing elements to the horizontal transfer register. Moreover, as disclosed in Japanese Unexamined Patent Application Publication No. 5-275673, when the potential at the electronic shutter gates is pinned to a certain low level, the dark current in the sensing elements can be suppressed.

The structure of the CCD linear sensor 1 according to the present invention will now be described with reference to the drawings.

Figure 1:
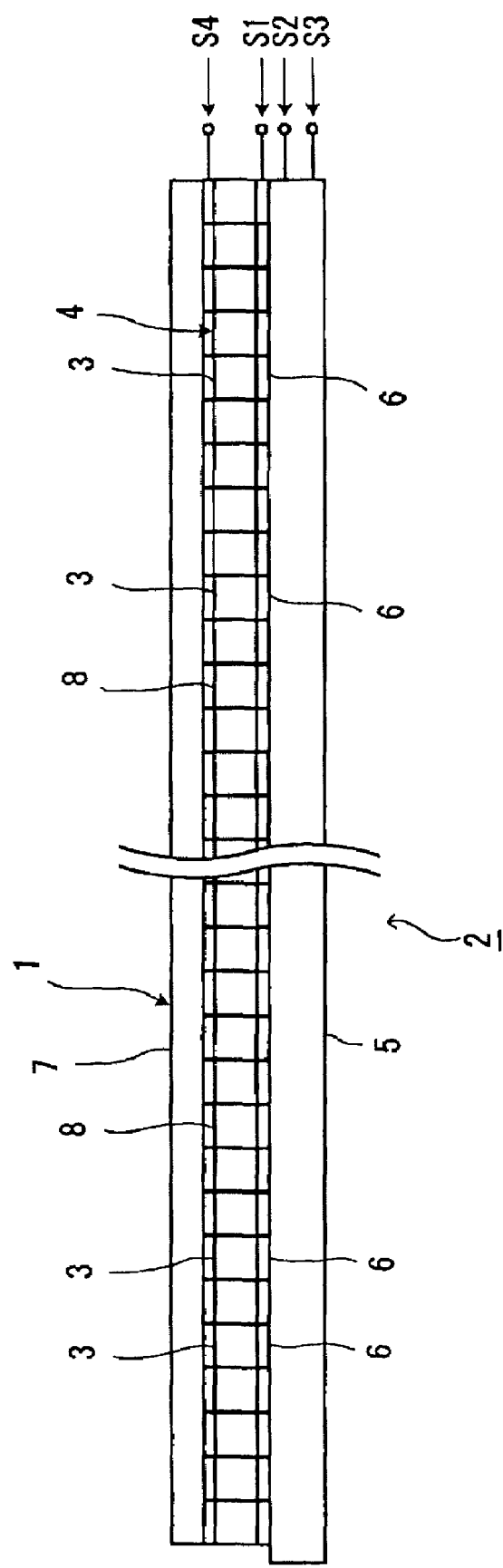
FIG. 1 is a plan view of a CCD linear sensor according to the present invention.

As shown in FIG. 1, the CCD linear sensor 1 includes a semiconductor substrate 2 and a sensor array 4 on the semiconductor substrate 2. The sensor array 4 includes sensing elements 3 in a row on the semiconductor substrate 2. The CCD linear sensor 1 further includes a horizontal transfer register 5 parallel to the sensor array 4 at a first side (at the lower side in FIG. 1) of the sensor array 4 and polysilicon read gates 6 between the sensing elements 3 and the horizontal transfer register 5.

The CCD linear sensor 1 further includes an electronic shutter drain 7 parallel to the sensor array 4 at a second side (at the upper side in FIG. 1) of the sensor array 4 and polysilicon electronic shutter gates 8 between the sensing elements 3 and the electronic shutter drain 7.

Figure 2:
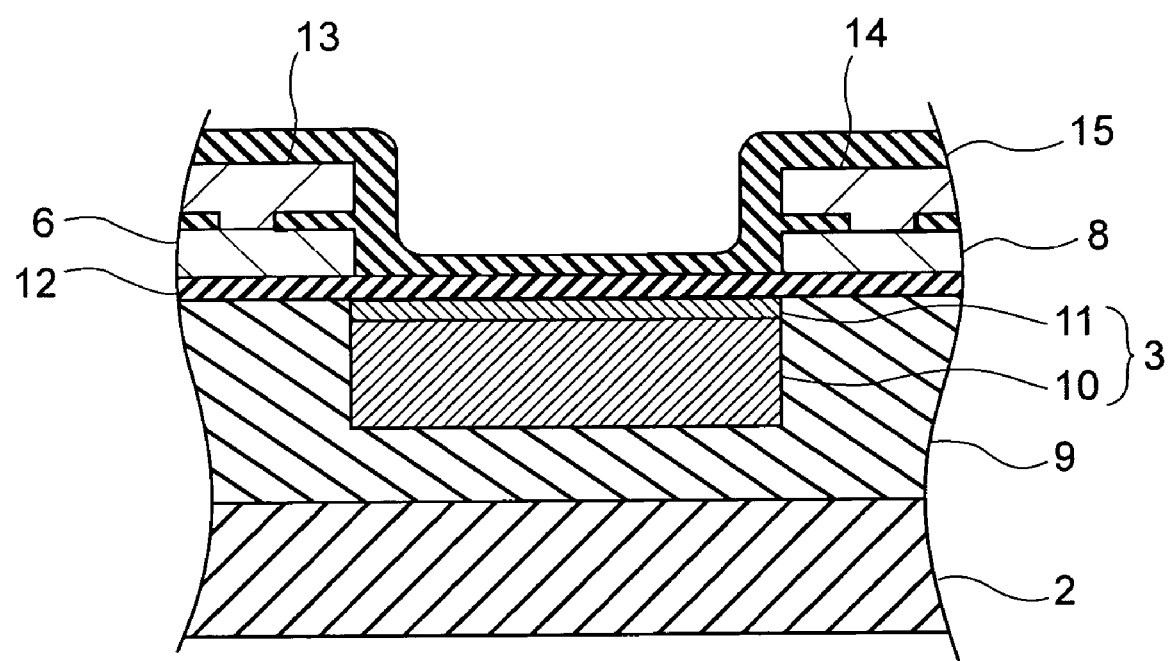
FIG. 2 is the sectional view of the CCD linear sensor.

The structure of a section of the CCD linear sensor 1 will now be described. As shown in FIG. 2, with respect to the sensing element 3, the CCD linear sensor 1 includes a p-type semiconductor well 9 on the semiconductor substrate 2, which is of the n-type. The sensing element 3 of a photodiode includes an n-type semiconductor layer 10 on a predetermined area on the p-type semiconductor well 9 and a p-type semiconductor layer 11 on the n-type semiconductor layer 10.

The CCD linear sensor 1 further includes a gate insulating layer 12 over the sensing element 3 and the p-type semiconductor well 9, the read gate 6 on the gate insulating layer 12, an aluminum signal line 13 connecting to the read gate 6, the electronic shutter gate 8 on the gate insulating layer 12, an aluminum signal line 14 connecting to the electronic shutter gate 8, and an insulating layer 15 covering the read gate 6, the electronic shutter gate 8, the gate insulating layer 12, the signal line 13, and the signal line 14. In this embodiment, though polysilicon, which is easily processed and which is free from metal contamination, and aluminum having low resistance are both used, either of them may not be required.

Figure 3:
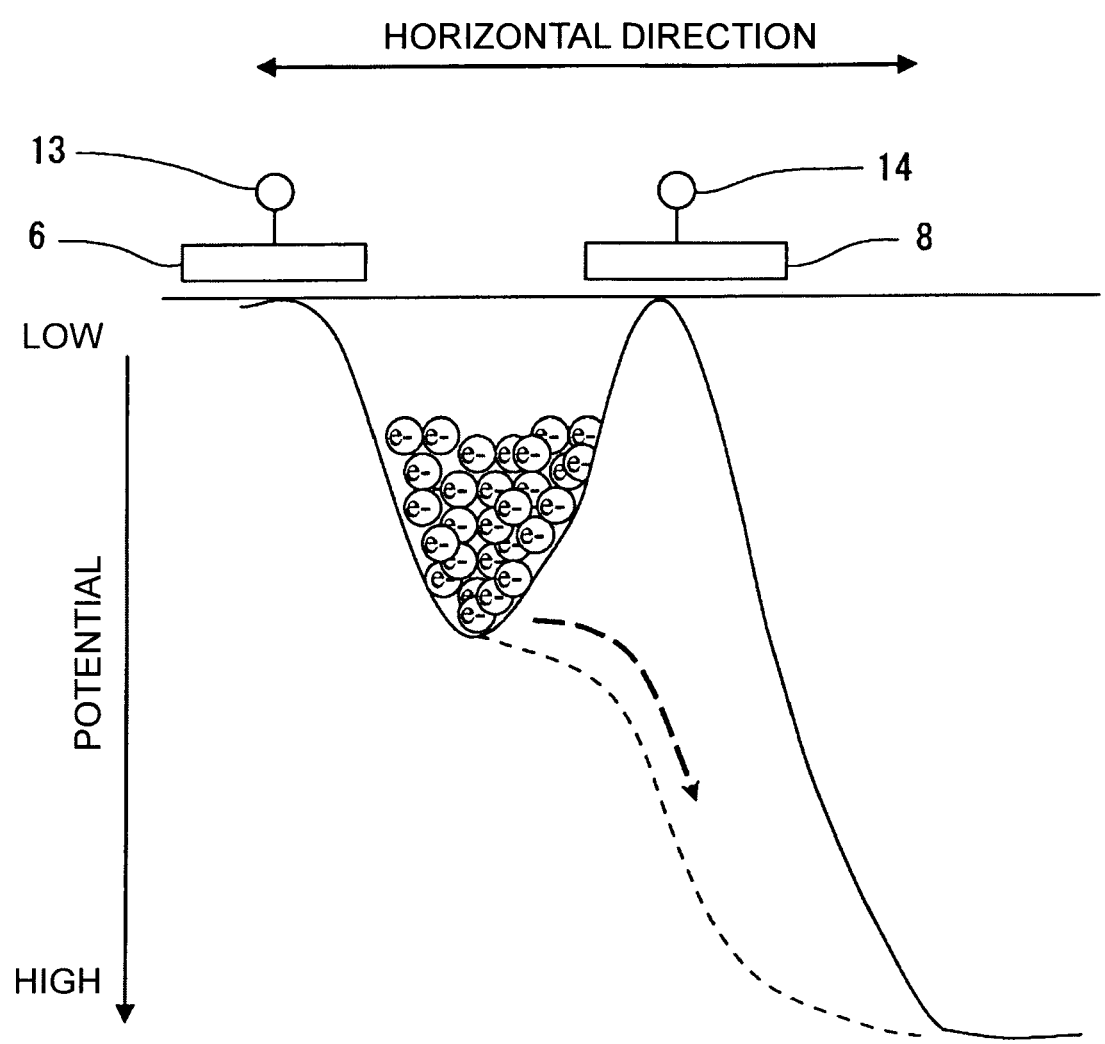
FIG. 3 illustrates the potential state in the CCD linear sensor, as viewed in cross-section.

The potential distribution in the neighborhood of the sensing elements 3 will now be described. As shown in FIG. 3, in the CCD linear sensor 1, the potential at the read gates 6 and the potential at the electronic shutter gates 8 are pinned to a certain low level. At this level, even when voltages applied to the read gates 6 and to the electronic shutter gates 8 are decreased, the potentials do not decrease any more. Electric charge is stored in a potential well formed between the read gates 6 and the electronic shutter gates 8, as viewed in cross-section.

Figure 4:
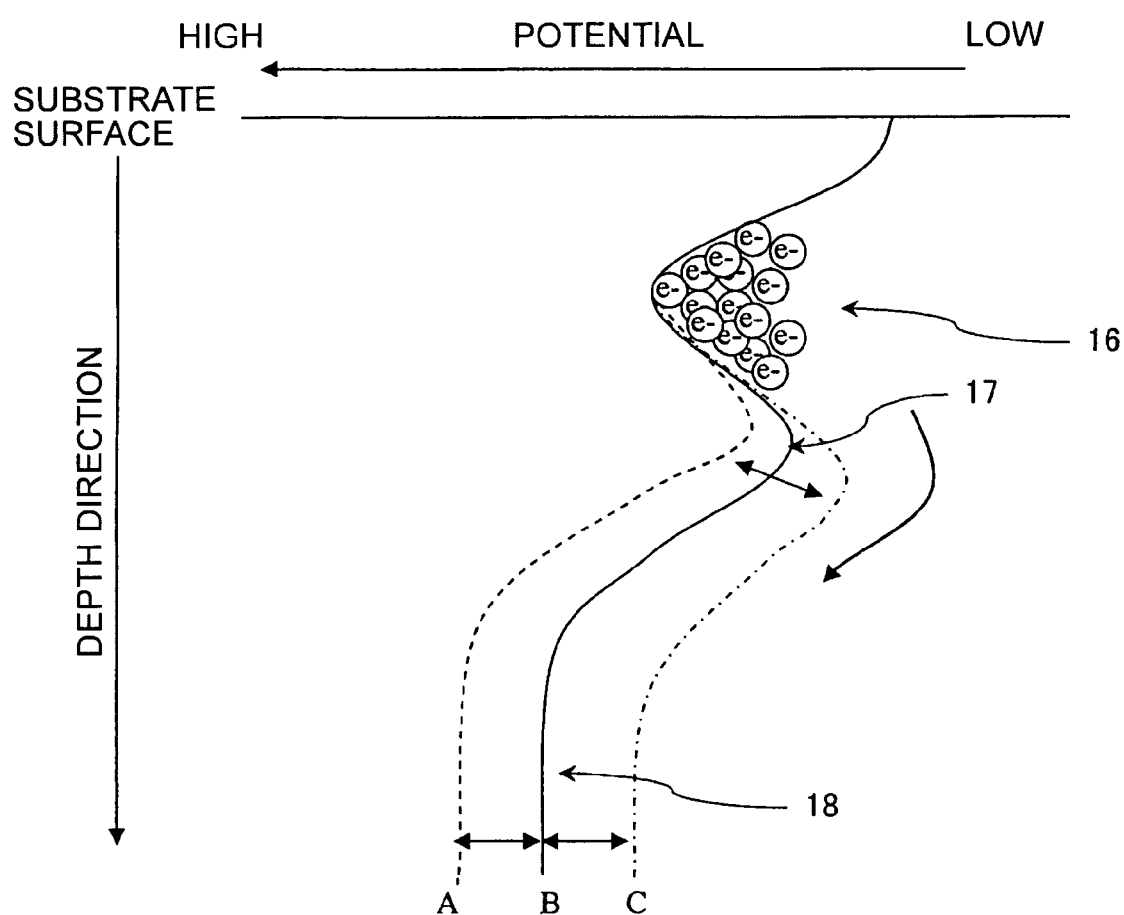
FIG. 4 illustrates the potential state in the depth direction of a semiconductor substrate in the CCD linear sensor.

Moreover, as shown in FIG. 4, in the CCD linear sensor 1, the implanted-ion concentration in the semiconductor substrate 2 is adjusted so as to set up a vertical overflow drain structure as follows: As viewed in the depth direction of the semiconductor substrate 2, the potential at the surface of the semiconductor substrate 2 is lowest. An electric charge storage area 16 is formed under the surface. There is a first potential peak in the electric charge storage area 16. An overflow barrier 17 is formed under the electric charge storage area 16. The potential at the overflow barrier 17 is lower than that in the electric charge storage area 16. Then, an overflow drain 18 is formed under the overflow barrier 17. The potential in the overflow drain 18 is higher than the potential at the overflow barrier 17.

In the CCD linear sensor 1, the potential at the overflow barrier 17 is higher than that at the electronic shutter gates 8.

In this arrangement, electric charge stored in the electric charge storage area 16 is discharged to the overflow drain 18 via the overflow barrier 17, but not to the electronic shutter drain 7 via the electronic shutter gates 8. This is because the potential at the overflow barrier 17 is higher than that at the electronic shutter gates 8. That is, saturated charge storage capacity in each sensing element 3 is determined by the potential at the overflow barrier 17. The overflow barrier 17 is formed by implanting ions, and there is small variance in the formation of the overflow barrier 17. Thus, the saturated charge storage capacity is less likely to vary.

Figure 5:
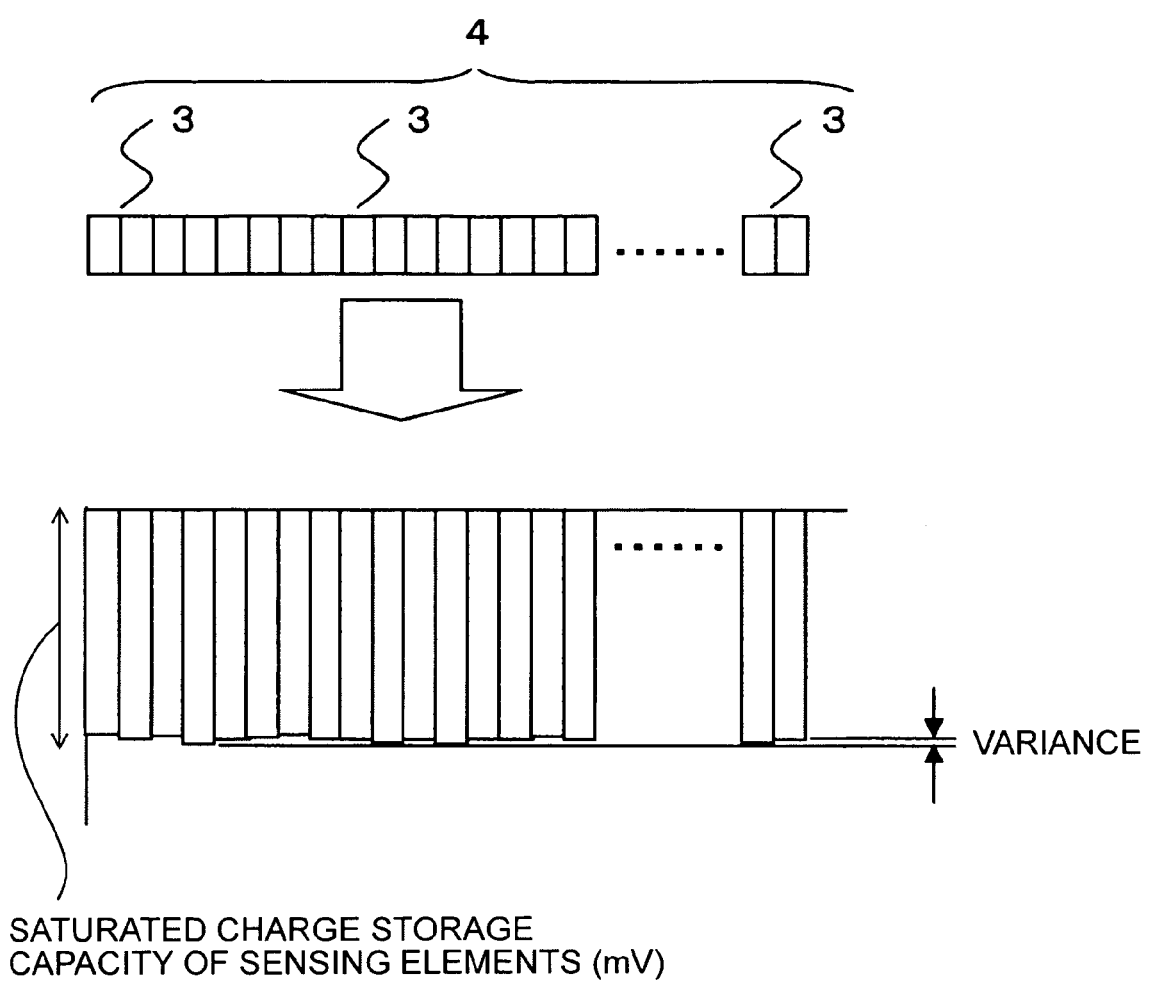
FIG. 5 illustrates variance among saturated charge storage capacities of sensing elements in the CCD linear sensor.
Figure 6:
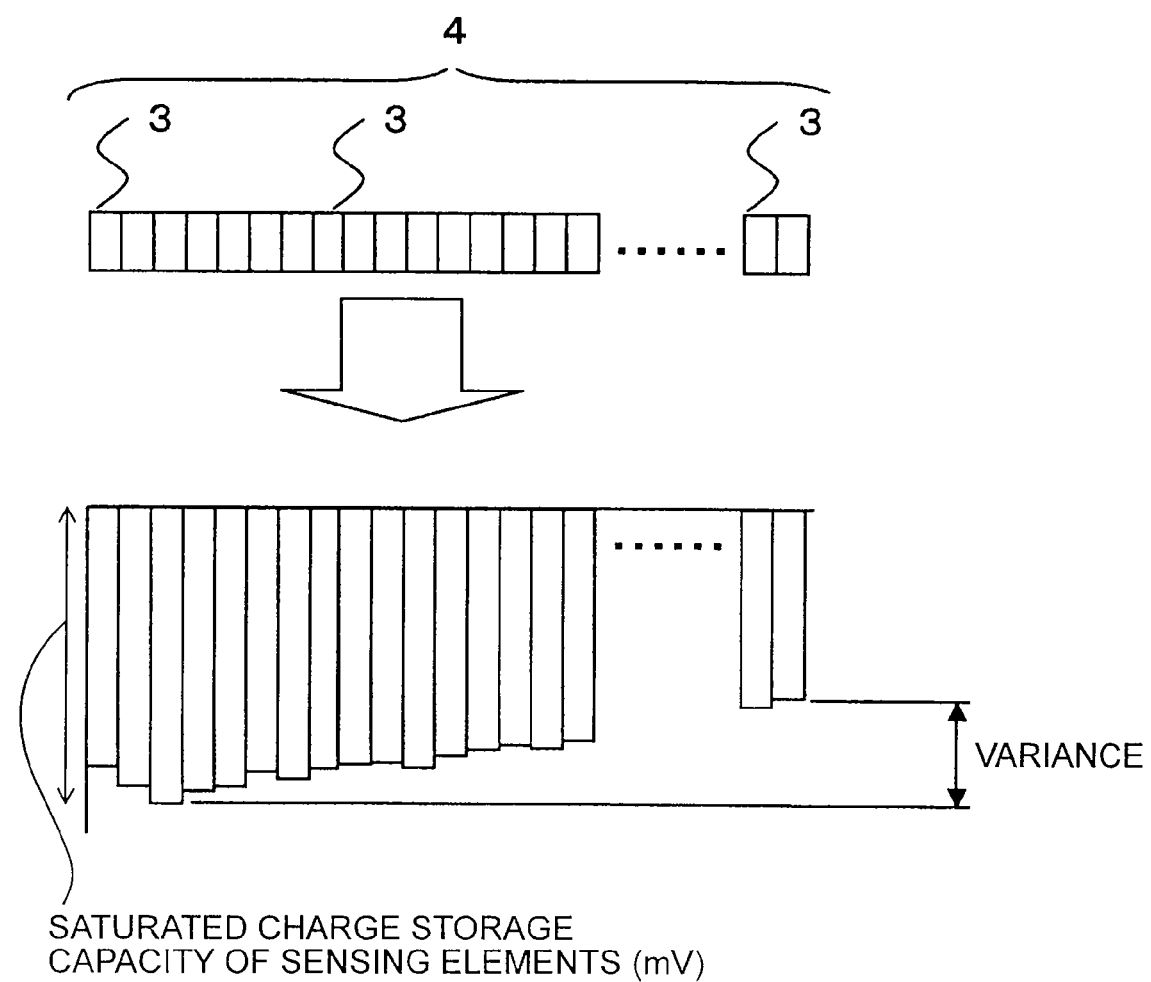
FIG. 6 illustrates variance among saturated charge storage capacities of sensing elements in a known CCD linear sensor.

Accordingly, even though variance occurs in manufacturing the electronic shutter gates 8, the saturated charge storage capacity in each sensing element 3 is substantially constant, as schematically shown in FIG. 5, thereby suppressing variance in output signals from the CCD linear sensor 1.

Figure 7:
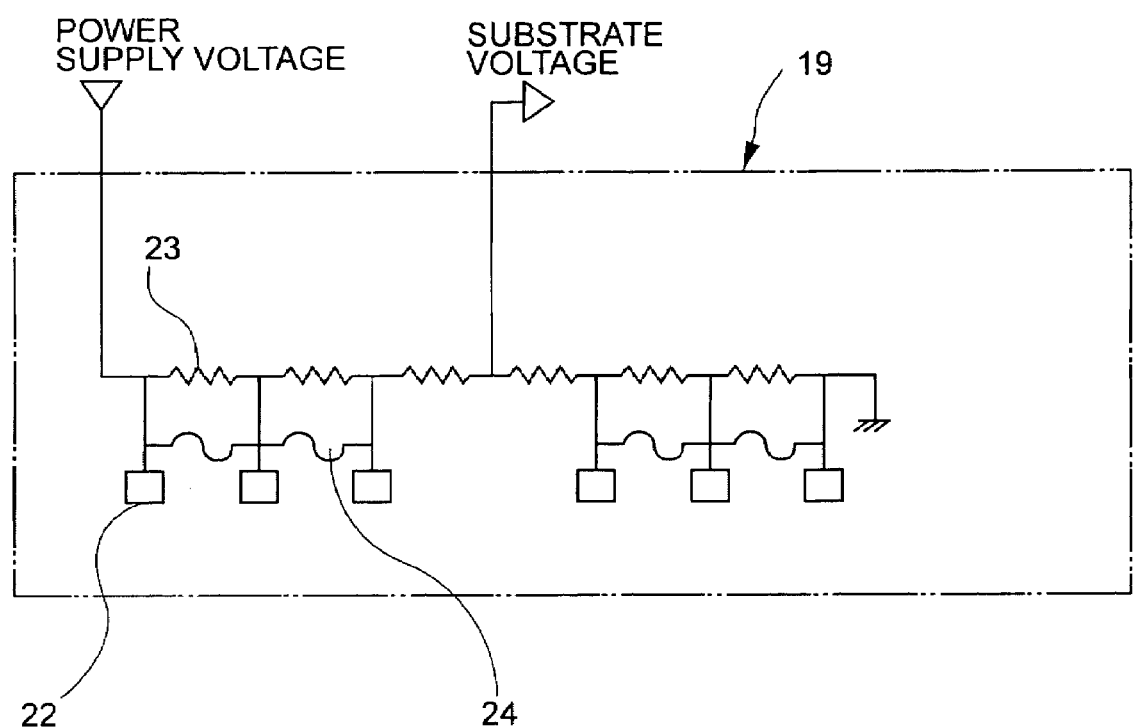
FIG. 7 illustrates a substrate-voltage adjusting circuit used in the CCD linear sensor.

The potential at the overflow barrier 17 can be changed by a voltage applied to the semiconductor substrate 2. Preferably, a substrate-voltage adjusting circuit 19, as disclosed in Japanese Unexamined Patent Application Publication No. 11-154735, is provided on the substrate 2. Such a substrate-voltage adjusting circuit is often used in a vertical overflow drain structure for solid-state image sensing elements to adjust a power supply voltage from the exterior of a substrate to a required voltage applied to the substrate, using resistors of, for example, polysilicon. FIG. 7 illustrates the substrate-voltage adjusting circuit 19. The substrate-voltage adjusting circuit 19 includes voltage-applying terminals 22 and a plurality of parallel circuits connected in series, each including a resistor 23 and a fuse 24. Each fuse 24 can be disconnected from the substrate-voltage adjusting circuit 19 by applying voltages to the voltage-applying terminals 22 at both ends of the fuse 24. When no fuse 24 is disconnected, the difference between a power supply voltage and a resulting substrate voltage is not large because each parallel circuit has a combined resistance of the resistor 23 and the fuse 24 having a lower resistance than the resistor 23. To set up the substrate-voltage adjusting circuit 19 having a required resistance to generate a required substrate voltage, the necessary steps are as follows: The required resistance is estimated; fuses 24 that need to be disconnected are determined to obtain the required resistance; and the corresponding fuses 24 are disconnected by applying voltages to the voltage-applying terminals 22 at both ends of the respective fuses 24. In this way, the required substrate voltage is generated from the power supply voltage. In view of usability, the substrate-voltage adjusting circuit 19 is preferably provided. Alternatively, the required substrate voltage from the exterior of the substrate 2 may be applied to the substrate 2 when the substrate-voltage adjusting circuit 19 is not provided.

That is, when the voltage applied to the semiconductor substrate 2 is increased, the potential at the overflow barrier 17 increases, i.e., the potential moves from the point indicated by a symbol B to that indicated by A in FIG. 4, and the saturated charge storage capacity in the electric charge storage area 16 is decreased. In contrast, when the voltage applied to the semiconductor substrate 2 is decreased, the potential at the overflow barrier 17 decreases, i.e., the potential moves from the point indicated by the symbol B to that indicated by C in FIG. 4, and the saturated charge storage capacity in the electric charge storage area 16 is increased.

Accordingly, in the CCD linear sensor 1, the potential at the overflow barrier 17 can be changed merely by a voltage applied to the semiconductor substrate 2, so that the saturated charge storage capacity can be easily changed.

The operation of the CCD linear sensor 1 having the structure described above will now be described.

In normal operation, electric charge stored in the sensing elements 3 is transferred to the horizontal transfer register 5 via the read gates 6 by applying a pulse signal S1 to the read gates 6 via the signal line 13. Then, the electric charge is transferred from the horizontal transfer register 5 to an image signal-processing circuit by applying pulse signals S2 and S3 to the horizontal transfer register 5.

In operation of electronic shutters, the potential at the electronic shutter gates 8 is temporarily increased (indicated by a dotted line in FIG. 3) by applying a signal S4 to the electronic shutter gates 8 via the signal line 14 so that electric charge stored in the sensing elements 3 is discharged to the electronic shutter drain 7 via the electronic shutter gates 8.

Moreover, when electric charge to be stored in each sensing element 3 exceeds the saturated charge storage capacity, excess electric charge overflows into the overflow drain 18 via the overflow barrier 17.

As described above, the CCD linear sensor 1 includes the overflow barrier 17 in addition to the sensing elements 3 and the electronic shutter gates 8. The potential at the overflow barrier 17 is higher than that at the electronic shutter gates 8. Thus, the saturated charge storage capacity in each sensing element 3 is determined by the potential at the overflow barrier 17, but not by the potential at the electronic shutter gates 8. Consequently, the saturated charge storage capacity is substantially constant regardless of variance in manufacturing the electronic shutter gates 8, thereby suppressing variance in output signals from the CCD linear sensor 1.

Moreover, since the saturated charge storage capacity is determined by the potential at the overflow barrier 17, the potential at the electronic shutter gates 8 need not be used for controlling the saturated charge storage capacity. Thus, the potential at the electronic shutter gates 8 can be pinned to a certain low level. This will increase the electric potential gradient from the sensing elements 3 to the horizontal transfer register 5, so that electric charge can be readily transferred from the sensing elements 3 to the horizontal transfer register 5. Moreover, when the potential at the electronic shutter gates 8 is pinned to a certain low level, the dark current in the sensing elements 3 can be suppressed.

What is claimed is:

1. A charge-coupled device (CCD) linear sensor comprising:
    a substrate;
    sensing elements in a row on the substrate;
    electronic shutter gates at sides of the respective sensing elements;
    an electronic shutter drain on the electronic shutter gates, such that the electronic shutter gates are between the respective sensing elements and the electronic shutter drain; and
    an overflow barrier below the sensing elements, the potential at the overflow barrier being higher than the potential at the electronic shutter gates,
    wherein,
    the overflow barrier is formed in the substrate below an electric charge storage area formed below a surface of the substrate.

2. The charge-coupled device (CCD) linear sensor according to claim 1, wherein the potential at the overflow barrier varies with a voltage applied to the substrate.

3. The charge-coupled device (CCD) linear sensor according to claim 1, further comprising a substrate-voltage adjusting circuit provided on the substrate, the substrate-voltage adjusting circuit adjusting a voltage applied to the substrate to change the potential at the overflow barrier.

* * * * *